US012204026B1

(12) United States Patent
Jiang (10) Patent No.: US 12,204,026 B1
(45) Date of Patent: Jan. 21, 2025

(54) PHOTONIC CHIP MODULE, LIDAR AND MOVABLE DEVICE

(71) Applicant: SUTENG INNOVATION TECHNOLOGY CO., LTD., Guangdong (CN)

(72) Inventor: Peng Jiang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/905,629

(22) Filed: Oct. 3, 2024

(30) Foreign Application Priority Data

Oct. 12, 2023 (CN) .......................... 202311317628.X (51) Int. Cl.
| | |
|---|---|
| *G01C 3/08* | (2006.01) |
| *G01S 7/4911* | (2020.01) |
| *G01S 7/4912* | (2020.01) |
| *G01S 17/32* | (2020.01) |
| *G02B 6/12* | (2006.01) |
| *G02B 6/00* | (2006.01) |

(52) U.S. Cl.
CPC ............. *G01S 17/32* (2013.01); *G01S 7/4911* (2013.01); *G01S 7/4912* (2013.01); *G02B 6/12004* (2013.01); *G02B 2006/0098* (2013.01); *G02B 2006/12061* (2013.01); *G02B 2006/12104* (2013.01)

(58) Field of Classification Search
CPC ...... G01S 17/32; G01S 7/4911; G01S 7/4912; G02B 6/12004; G02B 2006/0098; G02B 2006/12061; G02B 2006/12104
See application file for complete search history.

(56) References Cited

U.S. PATENT DOCUMENTS

| | | | |
|---|---|---|---|
| 12,025,739 B1 * | 7/2024 | Wang | G01S 17/931 |
| 12,044,889 B1 * | 7/2024 | Jiang | G02B 6/4246 |
| 2022/0196814 A1 * | 6/2022 | Lin | G01S 17/931 |
| 2024/0295697 A1 * | 9/2024 | Bérubé | G02B 6/262 |

FOREIGN PATENT DOCUMENTS

CN 114545556 A * 5/2022 ............... G02B 6/26

* cited by examiner

*Primary Examiner* — Mark Hellner
(74) *Attorney, Agent, or Firm* — Ladas & Parry LLP (57) ABSTRACT

Embodiments of the present application disclose a photonic chip module, a LiDAR and a movable device. The photonic chip module includes a photonic chip and a reflection module. The photonic chip includes a plurality of transceiving waveguide modules. A plurality of accommodating grooves are provided on a first surface of the photonic chip. The reflection module has a plurality of reflecting surfaces, and each reflecting surface is arranged at intervals along the second preset direction. The reflection surface is used to reflect the detection light so that the detection light is emitted in a direction that is not perpendicular to the thickness direction. The photonic chip module is conducive to improving the detection field of view of the LiDAR under the condition of the same resolution, or improving the resolution under the condition of the same total detection field of view.

13 Claims, 7 Drawing Sheets

PHOTONIC CHIP MODULE, LIDAR AND MOVABLE DEVICE

CROSS-REFERENCE TO RELATED APPLICATION

The present application claims the benefit of priority to Chinese Patent Application No. 202311317628.X, filed on Oct. 12, 2023, which is hereby incorporated by reference in its entirety.

TECHNICAL FIELD

The present application relates to the field of laser detection technology, and in particular to a photonic chip module, a LiDAR and a movable device.

BACKGROUND

A frequency modulated continuous wave (FMCW) LiDAR includes a light source module, a photonic chip module, a scanning module and a photoelectric detection module. Among them, the light source module is configured to generate detection light and local oscillator light. The photonic chip module includes an emitting waveguide and a receiving waveguide; the emitting waveguide is configured to transmit the above-mentioned detection light, and emit it through its output end to detect the target object; the receiving waveguide is configured to receive the echo light formed by the target object reflecting the detection light through its incident end. The scanning module includes a rotatable scanning device, which is configured to receive the detection light emitted by the photonic chip module and reflect it so that the detection light forms a detection field of view outside the LiDAR. In addition, the scanning module is also configured to receive the echo light, so that the echo light is reflected back to the receiving waveguide of the photonic chip module again. The photoelectric detection module is configured to receive the above-mentioned local oscillator light and echo light, so that the two optical signals beat to generate a beat signal, and perform photoelectric conversion on the beat signal. Among them, the output end of the emitting waveguide and the incident end of the receiving waveguide are staggered in the plane where the photonic chip is located. The direction of the staggered position corresponds to the fast-axis scanning direction of the LiDAR (such as the horizontal detection direction), which aims to improve the echo spot offset phenomenon caused by fast-axis scanning.

Some photonic chip modules include an emitting waveguide and a receiving waveguide, which work together to realize the transmission and reception of optical signals. Under the condition that the resolution in the slow-axis scanning direction of the LiDAR meets the requirements, this solution has a small detection field of view in the slow-axis scanning direction of the LiDAR (such as the vertical detection direction), that is, the detection field of view that can be achieved by the current photonic chip module is still small.

SUMMARY

The embodiments of the present application provide a photonic chip module, a LiDAR and a movable device to improve the detection field of view of the LiDAR.

In a first aspect, an embodiment of the present application provides a photonic chip module, including a photonic chip and a reflection module. The photonic chip includes a cladding and a plurality of transceiving waveguide modules embedded in the cladding, the transceiving waveguide module includes an emitting waveguide and a receiving waveguide, the emitting waveguide is configured to transmit detection light, the emitting waveguide has an output end for emitting detection light, the receiving waveguide is configured to transmit echo light, the receiving waveguide has an incident end for receiving the echo light, the echo light is formed by the target object reflecting the detection light, and when observed along the thickness direction of the photonic chip, the output end and the incident end are arranged at intervals along a first preset direction, and together constitute the transceiving end of the transceiving waveguide module, the transceiving end of each transceiving waveguide module is arranged at intervals along a second preset direction, the photonic chip has a first surface and a second surface opposite to each other along the thickness direction, the first surface is provided with a plurality of accommodating grooves, the transceiving end and the accommodating groove are alternately arranged along the second preset direction, each transceiving end corresponds to one accommodating groove, and the detection light emitted by the output end can be injected into the corresponding accommodating groove. The reflection module has a plurality of reflection surfaces, each of which is arranged at intervals along the second preset direction, each of the reflection surfaces, each of the transceiving waveguide modules and each of the accommodating grooves corresponds to each other, and the reflection surface and the corresponding transceiving end are arranged relative to each other along the second preset direction. The reflection surface is configured to reflect the detection light, so that the detection light is emitted in a direction that is not perpendicular to the thickness direction, and is configured to reflect the echo light, so that the echo light is emitted toward the incident end. The reflection surface is inclined relative to the first surface. Along the second preset direction, the reflection surface has a first end and a second end opposite to each other, the first end is closer to the transceiving end than the second end, the first end is located in the accommodating groove, and the second end is located on the side of the corresponding accommodating groove away from the corresponding transceiving end. Wherein, the first preset direction, the second preset direction and the thickness direction are perpendicular to each other.

In a second aspect, an embodiment of the present application provides a LiDAR, including a light source module, the above-mentioned photonic chip module, a scanning module and a photoelectric detection module. The light source module is configured to generate a source light signal. The photonic chip module is configured to transmit and emit the detection light, which is part of the source light signal, and to receive and transmit echo light. The scanning module is configured to reflect the detection light emitted by the photonic chip module, so that the detection light forms a detection field of view outside the LiDAR, and to reflect the echo light so that the echo light is emitted toward the photonic chip module. The photoelectric detection module is configured to receive local oscillator light and echo light transmitted via the photonic chip module, and the local oscillator light is part of the source light signal.

In a third aspect, an embodiment of the present application provides a movable device, comprising a movable body and the above-mentioned LiDAR, wherein the LiDAR is mounted on the body.

The photonic chip module provided in the embodiment of the present application includes a photonic chip and a reflection module. The photonic chip includes a plurality of transceiving waveguide modules, and the transceiving ends of each transceiving waveguide module are arranged at intervals along the second preset direction. A plurality of accommodating grooves are provided on the first surface of the photonic chip, and the transceiving ends and the accommodating grooves are alternately arranged along the second preset direction, and each transceiving end corresponds to an accommodating groove; the direction of the detection light emitted by the emission end points to the corresponding accommodating groove, and the emitted detection light can be injected into the accommodating groove. The reflection module has a plurality of reflection surfaces, and the reflection surfaces are arranged at intervals along the second preset direction, and each reflection surface, each transceiving waveguide module and each accommodating groove correspond to each other. Along the second preset direction, one end of the reflection surface is located in the accommodating groove, and the other end exceeds the accommodating groove, and the corresponding accommodating groove is away from the side of the corresponding transceiving end. The reflection surface is configured to reflect the detection light so that the detection light is emitted in a direction that is not perpendicular to the thickness direction, and is configured to reflect the echo light, so that the echo light is emitted to the incident end. In this way, the detection light emitted by each reflection surface can be staggered in the second preset direction, so that a plurality of corresponding sub-detection fields of view can be formed outside the LiDAR, and each sub-detection field of view together constitutes the total detection field of view of the LiDAR. Therefore, the photonic chip module provided in the embodiment of the present application is conducive to improving the detection field of view of the LiDAR under the condition of the same resolution, or improving the resolution under the condition of the same total detection field of view.

BRIEF DESCRIPTION OF DRAWINGS

In order to more clearly illustrate the embodiments of the present application, the drawings required for use in the embodiments will be briefly introduced below.

DESCRIPTION OF REFERENCE NUMERALS

1, Photonic chip module;
100, photonic chip; 110, substrate; 120, cladding;
130, transceiving waveguide module; 131, emitting waveguide;
132, receiving waveguide; 1311, input end; 1312, emission end;
1321, incident end; 1322, output end;
101, first surface; 102, second surface; 103, accommodating groove;
1031, first side wall; 1032, second side wall;
200, reflection module; 210, base; 220, reflection unit; 230, supporting portion;
221, reflection surface; 222, connection surface;
201, third surface; 202, fourth surface;
1b, photonic chip module; 100b, photonic chip; 110b, substrate;
120b, cladding; 130b, transceiving waveguide module;
101b, first surface; 103b, accommodating groove;
1031b, first side wall; 1032b, second side wall;
200b, reflection module; 220b, reflection unit;
221b, reflection surface; 222b, connection surface;
1c, photonic chip module; 100c, photonic chip; 110c, substrate;
120c, cladding; 130c, transceiving waveguide module;
101c, first surface; 103c, accommodating groove;
1031c, first side wall; 1032c, second side wall;
200c, reflection module; 220c, reflection unit;
221c, reflection surface; 222c, connection surface;
2, LiDAR; 21, Light source module; 22, Scanning module;
23, Photoelectric detection module;
3, Mobile device; 31, Main body;
X, first preset direction; Y, second preset direction; Z, third preset direction.

DETAILED DESCRIPTION

In order to make the objectives, technical solutions and advantages of the present application more clear, the embodiments of the present application will be further described in detail below with reference to the accompanying drawings.

When the following description refers to the drawings, unless otherwise indicated, the same numbers in different drawings represent the same or similar elements. The embodiments described in the following exemplary embodiments do not represent all embodiments consistent with the present application. Instead, they are only examples of devices and methods consistent with some aspects of the present application as detailed in the attached claims.

Some photonic chip modules include an emitting waveguide and a receiving waveguide, which cooperate with the receiving waveguide to realize the transmission and reception of optical signals; the emitting waveguide and the receiving waveguide are arranged in a direction parallel to the surface of the photonic chip, and the arrangement direction is the same as the fast axis scanning direction of the LiDAR, so that the receiving waveguide can receive the echo light and improve the walk-off effect caused by the fast axis scanning. Under the condition that the resolution of the LiDAR slow axis scanning direction meets the requirements, this solution has a small detection field of view in the slow axis scanning direction of the LiDAR (such as the vertical detection direction), the detection field of view that can be achieved by the current photonic chip module is still small. To overcome this shortcoming, some photonic chip modules adopt a solution of stacking multiple groups of transceiving waveguides in the thickness direction of the photonic chip. Since the thickness direction is perpendicular to the plane of the photonic chip, the detection field of view of each layer of transceiving waveguide can be stacked in the slow axis scanning direction, such as the vertical detection direction, thereby improving the field of view of the LiDAR in the vertical direction. However, the process of stacking multiple layers of transceiving waveguides in the thickness direction of the photonic chip is difficult and not conducive to mass production.

Figure 1:
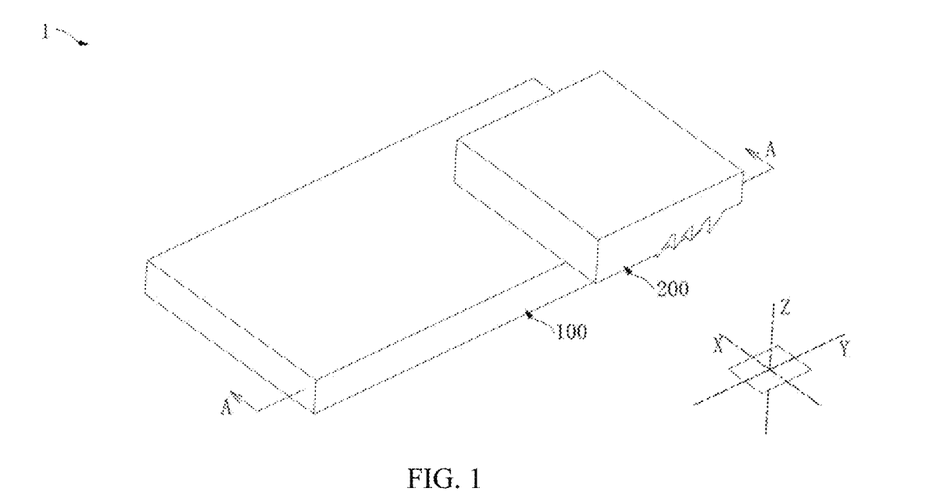
FIG. 1 is a three-dimensional schematic diagram of a photonic chip module provided in an embodiment of the present application.
Figure 2:
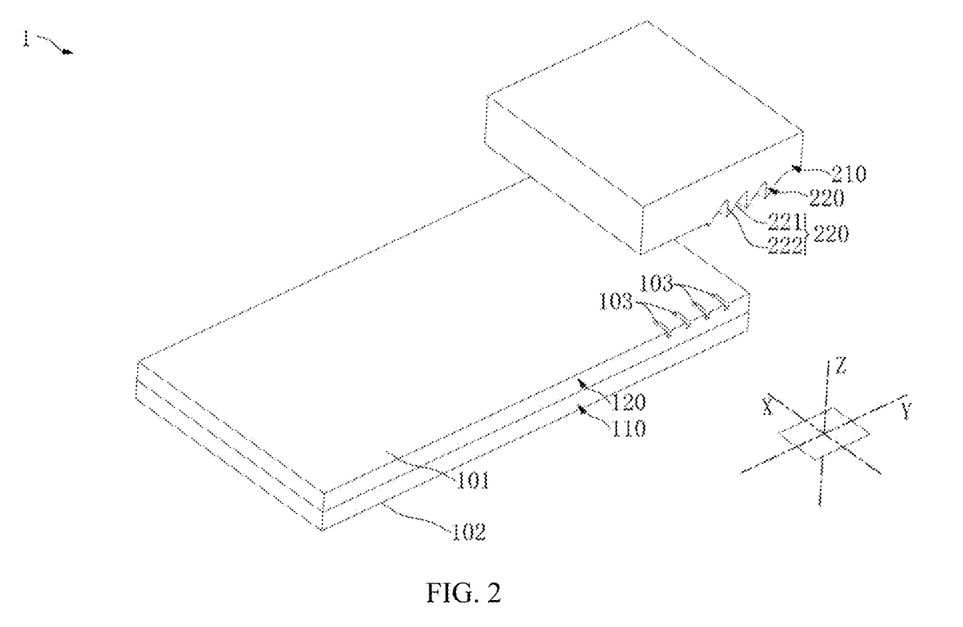
FIG. 2 is an exploded schematic diagram of the photonic chip module in FIG. 1.
Figure 3:
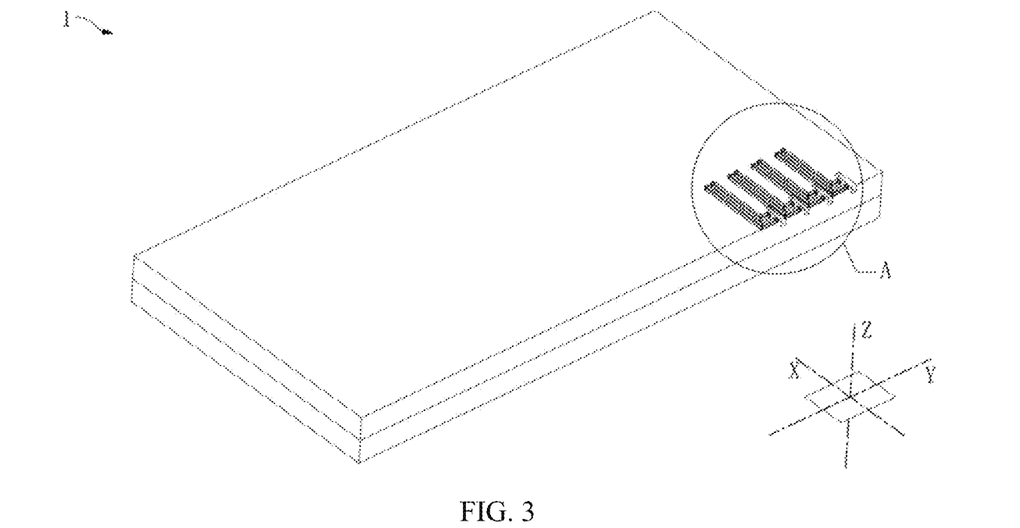
FIG. 3 is a three-dimensional schematic diagram of the photonic chip in FIG. 1.
Figure 4:
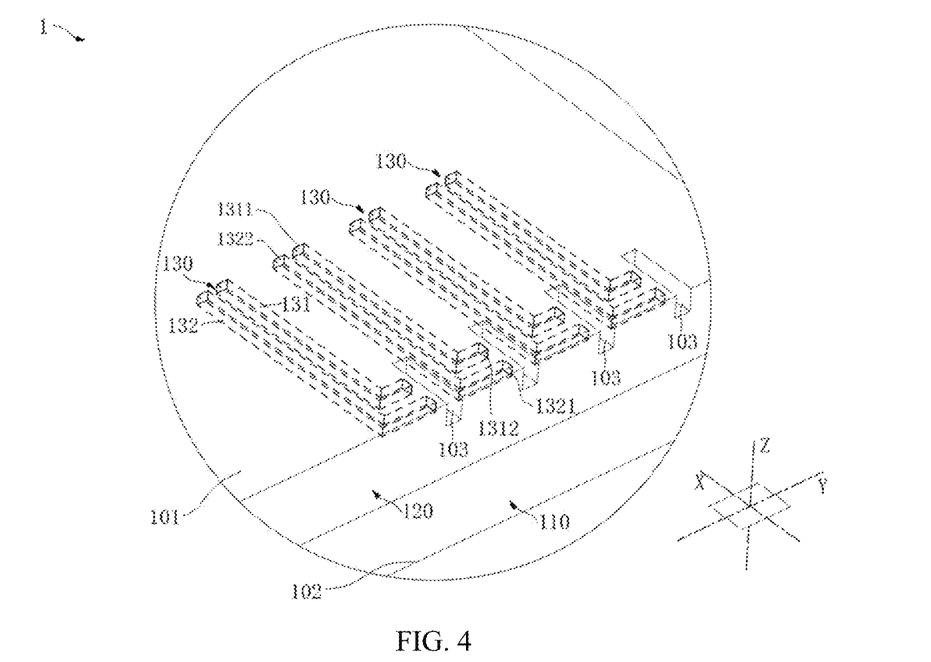
FIG. 4 is a partial enlarged schematic diagram of point A in FIG. 3.

Refer to FIG. 1 and FIG. 2, which respectively show a three-dimensional schematic diagram and a decomposed schematic diagram of a photonic chip module 1 provided in some embodiments. A photonic chip module 1 includes a photonic chip 100 and a reflection module 200. The photonic chip 100 includes a cladding 120 and a plurality of transceiving waveguide modules embedded in the cladding 120. Refer to FIG. 3 and FIG. 4, which respectively show a three-dimensional schematic diagram of the photonic chip in FIG. 1 and a partial enlarged schematic diagram at A in FIG. 3. The transceiving waveguide module 130 includes an emitting waveguide 131 and a receiving waveguide 132. The emitting waveguide 131 is configured to transmit detection light, and has an emission end 1312 for emitting the detection light; wherein the detection light is configured to detect the target object. The receiving waveguide 132 is configured to transmit echo light, and the receiving waveguide 132 has an incident end 1321 for receiving the echo light; wherein the echo light is formed by the target object reflecting the detection light. Observing along the thickness direction Z of the photonic chip 100, an emission end 1312 and an incident end 1321 are arranged at intervals along a first preset direction X shown in the figure, and the two together constitute the transceiving end of the transceiving waveguide module 130. The transceiving ends of multiple transceiving waveguide modules 130 are arranged at intervals along the second preset direction Y shown in the figure. In addition, the photonic chip 100 has a first surface 101 and a second surface 102 opposite to each other along the thickness direction Z, and the first surface 101 is provided with a plurality of accommodating grooves 103; the above-mentioned transceiving ends and the accommodating grooves 103 are alternately arranged along the second preset direction Y, each transceiving end corresponds to an accommodating groove 103, and the direction of the emission end 1312 emitting the detection light points to the corresponding accommodating groove 103, and the detection light emitted by the emission end 1312 can be injected into the corresponding accommodating groove 103.

Figure 5:
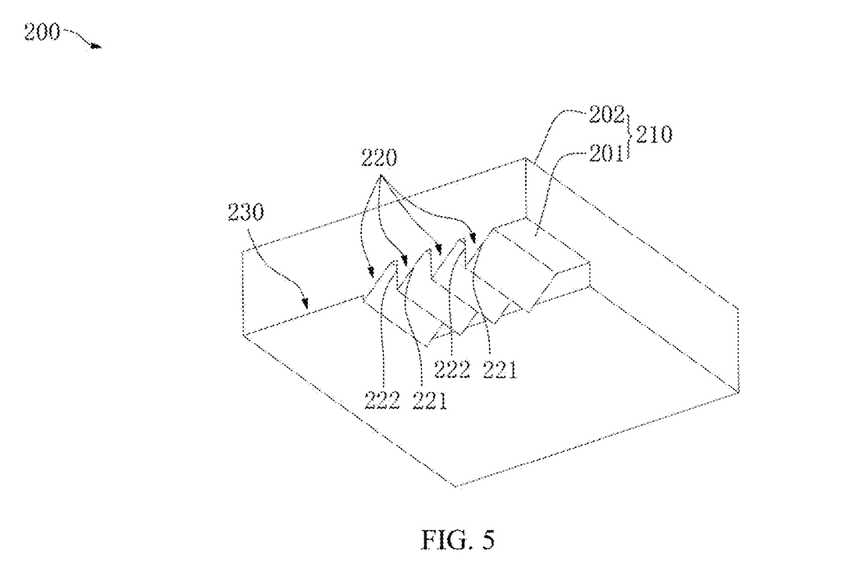
FIG. 5 is a perspective schematic diagram of the reflection module in FIG. 1.
Figure 6:
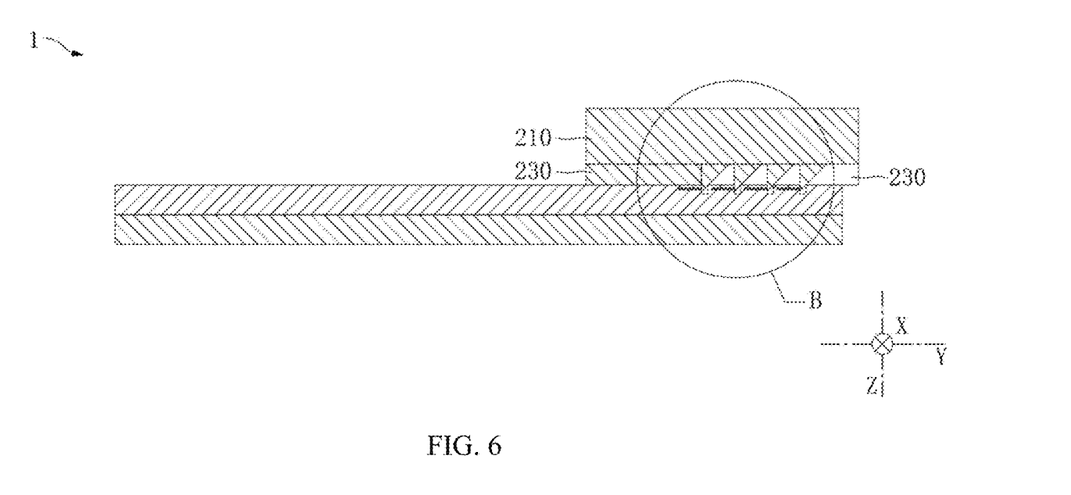
FIG. 6 is a schematic cross-sectional view of the photonic chip module along line A-A in FIG. 1.
Figure 7:
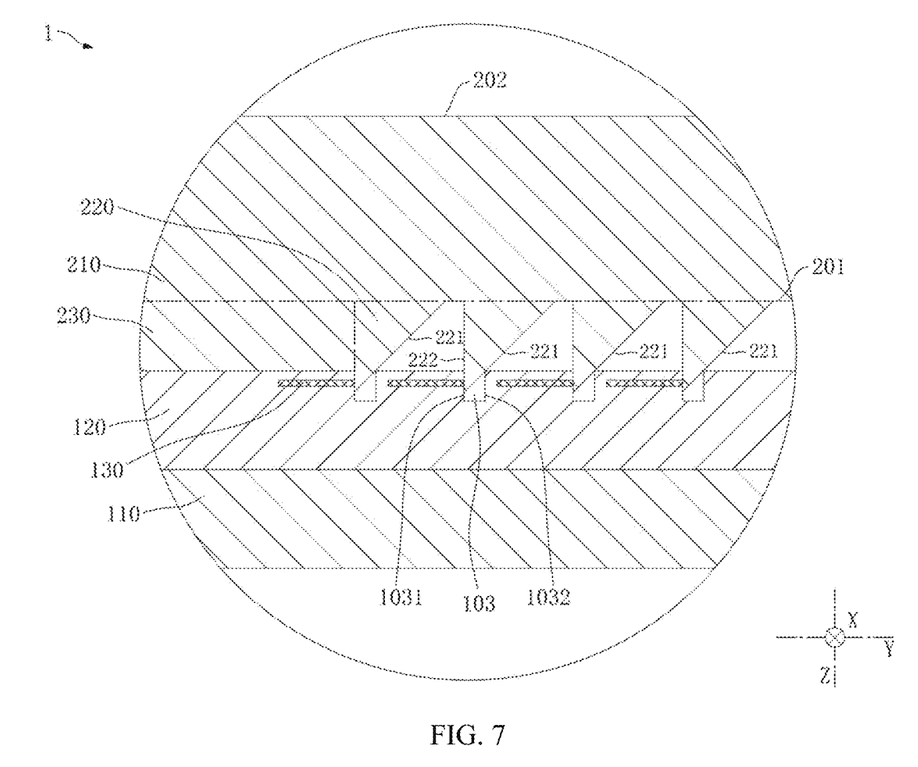
FIG. 7 is a partial enlarged schematic diagram of point B in FIG. 6.

Refer to FIGS. 5 to 7, which respectively show the three-dimensional schematic diagram of the reflection module 200 in FIG. 1, the cross-sectional schematic diagram of the photonic chip module 1 along the A-A line in FIG. 1, and the partial enlarged schematic diagram at B in FIG. 6. The reflection module 200 has a plurality of reflection surfaces 221, and each reflection surface 221 is arranged at intervals along a second preset direction Y. There is a one-to-one correspondence between each reflection surface 221, each transceiving waveguide module 130 and each accommodating groove 103. The reflection surface 221 and the corresponding transceiving end are arranged relative to each other along the second preset direction Y. The reflection surface 221 is configured to reflect the detection light, so that the detection light is emitted in a direction that is not perpendicular to the thickness direction, and is configured to reflect the echo light so that the echo light is emitted toward the incident end. The reflective surface 221 is inclined relative to the first surface. Along the second preset direction Y, the reflective surface 221 has a first end and a second end relative to each other. The first end is closer to the transceiving end than the second end. The first end is located in the accommodating groove 103, and the second end is located on the side of the corresponding accommodating groove 103 away from the corresponding transceiving end. In this way, the detection light emitted by each transceiving waveguide module 130 will be staggered in the second preset direction Y after being reflected by the corresponding reflective surface 221, so that each detection light can be stacked in the slow axis scanning direction. When the photonic chip module 1 is applied to a LiDAR, since the detection light emitted by each transceiving waveguide module 130 will form a sub-detection field of view outside the LiDAR, each sub-detection field of view together constitutes the detection field of view of the LiDAR, so the overall detection field of view of the LiDAR will be increased.

The photonic chip 100 is regarded as a flat structure, and the "first preset direction" is a direction perpendicular to the thickness direction Z of the photonic chip 100, which is a direction determined by one of the emission end 1312 and the incident end 1321 of the transceiving end pointing to the other when observed along the thickness direction Z; the "second preset direction" is a direction perpendicular to the above-mentioned thickness direction Z and the first preset direction X respectively.

For the photonic chip 100, refer to FIGS. 1, 2 and 4. The photonic chip 100 includes a substrate 110, a cladding 120 and a plurality of transceiving waveguide modules 130. The substrate 110 is a base material for laying the cladding 120; in an embodiment, the substrate 110 is made of silicon. In some embodiments, the substrate 110 can be made of other suitable materials, such as silicon nitride. The cladding 120 is deposited or grown on the substrate 110, and the direction of the stacking of the two is the thickness direction Z of the above photonic chip 100. The cladding 120 is one of the main structures constituting the photonic chip 100, and is the structure to which the transceiving waveguide module 130 is attached; the material of the cladding 120 is generally different from that of the substrate 110, and it can be made of materials such as silicon dioxide and/or silicon oxynitride. The transceiving waveguide module 130 is configured to receive and transmit the detection light generated by the light source module in the LiDAR, and emit it outward to detect the target object; and the transceiving waveguide module 130 is configured to receive the echo light formed by the target object reflecting the above detection light, and transmit it. The transceiving waveguide module 130 is embedded in the cladding 120, and the refractive index of the transceiving waveguide module 130 is greater than the refractive index of the cladding 120; thus, the transceiving waveguide module 130 and the cladding 120 together constitute a structure for stable light transmission, the light can be transmitted along the transceiving waveguide module 130, and it is not easy to overflow from the photonic chip 100 through the cladding 120. For example, when the cladding 120 is made of silicon dioxide, the structure in the transceiving waveguide module 130 may include materials with a larger refractive index such as silicon nitride and/or silicon. The substrate 110 is intended to support the cladding 120 during the manufacturing process of the photonic chip 100; in some cases, the substrate 110 can be omitted.

The photonic chip 100 has a first surface 101 and a second surface 102 which are arranged opposite to each other along the thickness direction Z. In an embodiment, the first surface 101 is the side of the cladding 120 away from the substrate 110, and the second surface 102 is the side of the substrate 110 away from the cladding 120. In some embodiments, the first surface 101 can be the side of the cladding 120 away from the substrate 110, and correspondingly, the second surface 102 is the side of the cladding 120 away from the substrate 110. The first surface 101 is provided with a plurality of accommodating grooves 103; each accommodating groove 103 corresponds to a transceiving end of each transceiving waveguide module 130 one by one, and each accommodating groove 103 and each transceiving end are alternately arranged along the second preset direction Y, and each accommodating groove 103 is located at the side of the corresponding transceiving end emitting the detection light. Taking the first surface 101 as a reference, the depth of the accommodating groove 103 is greater than the depth of the transceiving waveguide module 130, so that the detection light emitted by the transceiving waveguide module 130 can enter the accommodating groove 103 and the reflective unit 220 at least partially located in the accommodating groove 103. The side wall of the accommodating groove 103 includes a first side wall 1031 (combined with FIG. 7) and a second side wall 1032 arranged opposite to each other along the second preset direction Y. The first side wall 1031 is the side wall portion of the accommodating groove 103 close to the corresponding transceiving end, and the second side wall 1032 is the side wall portion of the accommodating groove 103 away from the corresponding transceiving end.

For transceiving waveguide module 130, refer to FIG. 4. In combination with FIG. 1 and FIG. 2, the transceiving waveguide module 130 includes an emitting waveguide 131 and a receiving waveguide 132. The emitting waveguide 131 is configured to transmit the detection light, and has an input end 1311 and an emission end 1312 opposite to each other along the extension direction; the emitting waveguide 131 receives the detection light generated by the light source module in the LiDAR via the input end 1311, so that the detection light is transmitted in the emitting waveguide 131; in addition, the emitting waveguide 131 emits the detection light via the emission end 1312, so that the detection light detects the target object outside LiDAR. The receiving waveguide 132 has an incident end 1321 and an output end 1322 which are opposite to each other along the extension direction; the receiving waveguide 132 receives the echo light via the incident end 1321, so that the echo light enters the photonic chip 100 and is transmitted therein; the receiving waveguide 132 outputs the echo light to the downstream photoelectric detection module via the output end 1322. The emission end 1312 is arranged close to the incident end 1321, and both face the corresponding accommodation groove 103, so that the detection light emission and the echo light reception can be realized at this position.

When observed along the thickness direction Z, the emission end 1312 and the incident end 1321 are spaced apart along a first preset direction X shown in the figure. The emission end 1312 and the incident end 1321 together constitute the transceiving end of the transceiving waveguide module 130. The "emission end" means a structure formed by extending a preset distance from the light output end surface of the emitting waveguide 131 to the input end 1311. In an embodiment, the emission end 1312 is in a straight line shape; the "incident end" means a structure formed by extending a preset distance from the light input end surface of the receiving waveguide 132 to the output end 1322. In this embodiment, the incident end 1321 is in a straight line shape.

Since the scanning module has rotated a certain angle during the process of the detection light reflecting from the scanning module to a target object and the echo light returning to the scanning module again, the light spot where the echo light finally falls on the photonic chip 100 has a certain position offset relative to the light spot position when the detection light is emitted, this effect is referred as the walk-off effect. If the distance between the emission end 1312 and the incident end 1321 is too large, it is easy for the echo light reflected by the close-range target object to fail to smoothly fall on the incident end 1321 of the receiving waveguide 132, thereby causing a detection blind spot; therefore, the distance between the emission end 1312 and the incident end 1321 cannot be too large. In an embodiment, the distance between the emission end 1312 and the incident end 1321 in the same transceiving waveguide module 130 is less than 10 microns. The range of light that can be received by a single receiving waveguide 132 is limited, so the mode field of the received echo light can be increased by setting multiple receiving waveguides 132; in some embodiments, a transceiving waveguide module 130 includes multiple receiving waveguides 132, and incident end 1321 of each receiving waveguide 132 is arranged at intervals along the first preset direction X.

The scanning rate of the fast-axis scanning device of the scanning module in the LiDAR is higher than the scanning rate of the slow-axis scanning device, so the walk-off effect caused by the fast-axis scanning device is more obvious, and the walk-off effect caused by the slow-axis scanning device is smaller; therefore, the direction of the interval between the above-mentioned emission end 1312 and the incident end 1321 should be matched with the direction of the fast-axis scanning, that is, the first preset direction X should be consistent with the direction of the fast-axis scanning.

The transceiving ends of each transceiving waveguide module 130 are arranged along the second preset direction Y. Each emitting waveguide 131 is bent in the first preset direction X relative to the emission end 1312 at a position other than the emission end 1312, so as to facilitate the access of the detection light. In an embodiment, the bending directions of each emitting waveguide 131 are the same, so that each emitting waveguide 131 can access the detection light from a similar position; for example, as shown in FIG. 4, the other parts of each emitting waveguide 131 are bent and extended toward the left side of the figure relative to the emission end 1312. The emitting waveguide 131 can be bent once or more on the basis of the above, so as to facilitate the input of the detection light. Each receiving waveguide 132 is bent in the first preset direction X relative to the input end 1321 at a position other than the input end 1321, so as to facilitate the transmission of the echo light downstream. In an embodiment, the bending directions of the receiving waveguides 132 are the same, so that the receiving waveguides 132 output the echo light in the same direction; for example, as shown in FIG. 4, the other parts of the receiving waveguides 132 are bent and extended toward the left side of the figure relative to the incident end 1321. The receiving waveguides 132 can be bent once or more on the basis of the above, so as to facilitate the output of the echo light to the photoelectric detection module.

Then, for the reflection module 200, refer to FIG. 5. The reflection module 200 includes a base 210 and a plurality of reflection units 220. The base 210 is disposed on the side of the cladding 120 where the first surface 101 is disposed, and the reflection unit 220 is fixed to the base 210 and is located between the base 210 and the photonic chip 100. The structures of the base 210 and the reflection unit 220 are described in turn below.

For the aforementioned base 210, refer to FIG. 6 and FIG. 7 in detail. In combination with FIG. 5, the base 210 is flat or block-shaped as a whole, and is disposed on the side of the cladding 120 where the first surface 101 is disposed. The base 210 has a third surface 201 and a fourth surface 202 that are opposite to each other along the thickness direction Z, wherein the third surface 201 is the surface of the base 210 that is disposed opposite to the photonic chip 100, and the fourth surface 202 is the surface of the base 210 that is away from the photonic chip 100. The base 210 is made of a material that allows the detection light to pass through, so as to allow the detection light reflected by the reflection unit 220 to pass through, and to allow the echo light to be emitted toward the reflection unit 220 through it.

For the reflective unit 220, refer to FIG. 6 and FIG. 7, and in combination with FIG. 5, each reflective unit 220 is arranged at intervals along the second preset direction Y, and each reflective unit 220 is arranged one-to-one with each accommodating groove 103. The reflective unit 220 is fixed to the base 210, and is in the shape of a triangular prism extending along the first preset direction X. The reflective unit 220 is a structure in which the detection light can propagate, and has a reflective surface 221 and a connecting surface 222 both extending along the first preset direction X; the reflective surface 221 and the connecting surface 222 are both side surfaces of the triangular prism structure, and the other side surface of the triangular prism structure is attached to the base 210, so as not to be exposed to the outside. The reflective surface 221 is disposed obliquely relative to the first surface 101 of the photonic chip 100. When viewed along the first preset direction X, one end of the reflective surface 221 extends into the above-mentioned accommodating groove 103 and is disposed close to the corresponding transceiving end, and the other end obliquely extends outside the photonic chip 100 and is located between the corresponding accommodating groove 103 and an adjacent accommodating groove 103 along the second preset direction Y. Along the second preset direction Y, the reflective surface 221 has a first end and a second end opposite to each other. The first end is the end of the reflective surface 221 close to the corresponding transceiving end and is located in the accommodating groove 103. The second end is the end of the reflective surface 221 away from the corresponding transceiving end, which extends out of the accommodating groove 103 and is located on the side of the accommodating groove 103 away from the corresponding transceiving end. The connecting surface 222 is connected to the first end of the reflective surface 221, one end of which is connected to the reflective surface 221 and the other end of which extends away from the second surface 102. The connecting surface 222 is used for allowing the detection light to enter the reflection unit 220 so that the detection light is reflected by the reflection surface 221, and for allowing the echo light reflected from the reflection surface 221 to be emitted so that the echo light is emitted toward the incident end 1321.

In an embodiment, the reflection surface 221 reflects the above-mentioned detection light and echo light by total reflection. The refractive index of the reflection unit 220 is greater than the refractive index of the medium on the side of the reflection surface 221 away from the connection surface 222; when the detection light or the echo light is incident on the reflection surface 221, and the incident angle is greater than the critical angle, the detection light or the echo light will be propagated by total reflection, and will not be propagated in the form of transmission to the medium on the side of the reflection surface 221 away from the connection surface 222. Among them, configure the incident angle of the detection light and the echo light incident on the reflection surface 221 to be greater than the critical angle. A medium on the side of the reflection surface 221 away from the connection surface 222 can be air, or it can be an adhesive filled between the reflection unit 220 and the photonic chip 100 to enhance the fixing effect of the reflection module 200 and the photonic chip 100.

When the photonic chip 100 is used, the first preset direction X should match a direction with a faster scanning rate of the scanning module; in an embodiment, the horizontal scanning rate (the scanning axis extends in the vertical direction) of the scanning module is higher than the vertical scanning rate (the scanning axis extends in the horizontal direction), and the offset direction of the walk-off effect caused by the horizontal scanning direction is consistent with the first preset direction X, thereby ensuring that the receiving waveguide 132 can receive the echo light; the first preset direction X corresponds to the horizontal scanning direction of the LiDAR, and the second preset direction Y can be configured to correspond to the vertical direction of the LiDAR. The arrangement of the multiple transceiving waveguide modules 130 and the multiple reflection units 220 enables the detection light emitted by each transceiving waveguide module 130, to form a total of multiple sub-detection fields of view arranged in the vertical direction outside the LiDAR, and each sub-detection field of view together constitutes the detection field of view of the LiDAR. In some embodiments, if the vertical scanning rate of the scanning module is higher than the horizontal scanning rate, it should be ensured that the offset direction of the walk-off effect caused by the vertical scanning direction is consistent with the above-mentioned first preset direction X. In this way, the detection light reflected by the reflection surface 221 of each reflection unit 220 will be staggered in the second preset direction Y, the detection light emitted by each reflection unit 220 to the outside of the LiDAR will be staggered in the horizontal direction to form a plurality of corresponding detection fields of view, and the plurality of detection fields of view together constitute the total detection field of view of the LiDAR. Therefore, the arrangement of the transceiving end of the multi-transceiving waveguide module 130 and the multi-reflection unit 220 along the second preset direction Y can improve the total detection field of view of the LiDAR.

In some embodiments, an angle between the reflection surface 221 and the thickness direction Z may be between 40° and 50°; for example, the angle between the reflection surface 221 and the thickness direction Z is 45°. In this way, the detection light reflected by the reflection surface 221 can be emitted outside the photonic chip 100 along the thickness direction Z. Optionally, the reflection surfaces 221 are arranged in parallel along the second preset direction Y, which can make the directions of the detection lights reflected by each reflection surface 221 the same. The reflection surfaces 221 are arranged uniformly at intervals along the second preset direction Y; this arrangement is intended to make the field of view angle covered by each transceiving waveguide module 130 in the vertical direction of the LiDAR approximately the same.

As for the fixing method between the reflective module 200 and the photonic chip 100, there are various methods. In some embodiments, the reflective module 200 can be fixed to the photonic chip 100 by snapping the reflective unit 220. The portion of the connecting surface 222 extending into the accommodating groove 103 is in contact with the first side wall 1031, and the reflective surface 221 is in contact with the top of the second side wall 1032, so that the reflective module 200 is snapped and fixed to the photonic chip 100. In some embodiments, in order to avoid excessive local stress caused by the linear contact between the reflective surface 221 and the top of the second side wall 1032, the top of the second side wall 1032 can be set as an inclined surface adapted to the inclination angle of the reflective surface 221, so that the reflective surface 221 is in contact with the top contour surface of the accommodating groove 103, thereby reducing the above-mentioned stress. In some embodiments, the portion of the reflective module 200 outside the reflective unit 220 may be fixed to the photonic chip 100, and the reflective unit 220 and the accommodating groove 103 may be positioned and preliminarily fixed only by snapping. There are many other ways to fix the reflective module 200 and the photonic chip 100.

In an embodiment, the reflective module 200 includes a supporting portion 230. The supporting portion 230 is fixed to one end of the base 210 facing the photonic chip 100 and is fixed to the photonic chip 100. In an embodiment, the supporting portion 230 is arranged in the area of the base 210 facing the photonic chip 100 except for each reflective unit 220. The supporting portion 230 includes a first portion and a second portion. The first portion is located at one side of each reflective unit 220, and the direction in which the first portion points to each reflective unit 220 is the same as the direction in which the transceiving end points to the corresponding reflective surface 221, both from left to right as shown in FIG. 7; as shown in FIG. 7, the first portion is located on the left side of each reflective unit 220. The first portion is integrally arranged with the reflective unit close to the first portion, so that the connection surface 222 of the reflective unit 220 adjacent to the first portion extends to connect with the first portion; and the connection surfaces of the remaining reflective units 220 extend to connect with the base 210. Along the first preset direction X, the second portion is located on one side of the first portion and each reflective unit 220. The supporting portion 230 fills the gap between the base 210 and the first surface 101 of the photonic chip 100, avoiding the instability problem caused by the overall structure of the base 210 being suspended relative to the photonic chip 100, and improving the stability of the reflective module 200 when installed on the photonic chip 100. At the same time, the supporting portion 230 is provided so that the reflective module 200 can be fixed to the photonic chip 100 through the supporting portion 230. The fixing effect of this embodiment is better; in this case, the clamping of the reflective unit 220 and the accommodating groove 103 can be used for preliminary positioning.

Figure 8:
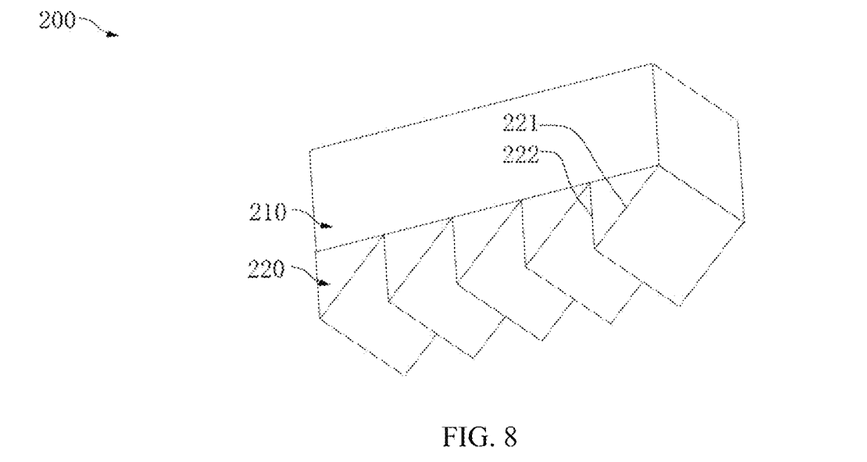
FIG. 8 is a perspective schematic diagram of a reflection module provided in an embodiment.

The embodiment is described by taking the third surface 201 of the base 210 as larger than the area where each reflective unit 220 is located, and the reflective module 220 is disposed between the base 210 and the photonic chip 100 as an example, the arrangement of the base 210 is very flexible, as long as it is connected to each reflective module 220. Refer to FIG. 8, in some embodiments, the third surface of the base 210 can be configured to set the reflective units 220, when observed along the thickness direction Z, the area where the base 210 exceeds each reflective unit 220 can be omitted; wherein FIG. 8 shows five reflective units 220. In some embodiments, the base 210 may be disposed on one side of each reflection module 220 along the first preset direction X, and respectively connected to each reflection module 220. In this case, the base 210 may be directly supported and fixed on the first surface of the photonic chip 100; in this case, the base 210 serves as the function of the above-mentioned supporting portion 230. In addition, in some scenarios, the base 210 may be omitted.

In an embodiment, the accommodating groove 103 is provided at one end of the photonic chip 100 along the first preset direction X, and the end along the first preset direction X extends to penetrate the photonic chip 100 to form a through opening. Correspondingly, along the first preset direction X, one end of the reflecting unit 220 is located in the accommodating groove 103, and the other end extends out of the photonic chip 100 through the through opening. The reflecting unit 220 is a micro-mirror structure at the level of the photonic chip 100. A size of the reflecting unit 220 in each direction is difficult to be extremely small. The above mentioned opening of one end of the accommodating groove 103 along the first preset direction X is conducive to the photonic chip 100 to receive the part of the reflecting unit 220 configured to transmit the detection light and the echo light through the smaller accommodating groove 103, thereby freeing up available space for other devices in the photonic chip 100. In some embodiments, the accommodating groove 103 being located at the edge of the photonic chip 100 as an example, in some embodiments, the accommodating groove 103 is a partial structure for accommodating the reflecting surface 221, so that optical signal propagation can be achieved between the transceiving end and the reflecting surface 221. In some embodiments, when observed along the thickness direction Z, the accommodating groove 103 is entirely located inside the edge contour of the photonic chip 100.

In some embodiments, a first side wall 1031 is provided with a first groove, and the transceiving end is located on the side of the first groove away from the accommodating groove 103, and is arranged opposite to the first groove. This arrangement is intended to prevent the transceiving end from being exposed in the accommodating groove 103, thereby rubbing against the connection surface 222 and affecting the end surface flatness of the emission end 1312 and the incident end 1321, thereby affecting the effect of the emission end 1312 and the incident end 1321 emitting or receiving optical signals. The transceiving end itself can be designed to be completely embedded relative to the cladding 120, but if the first groove is not provided, the first side wall 1031 may also rub against the connection surface 222 at the position corresponding to the transceiving end, thereby affecting the light transmittance. Therefore, regardless of whether the end face of the transceiving end is exposed relative to the cladding 120, the provision of the first groove can reduce the impact of the assembly friction between the photonic chip 100 and the connecting surface 222 on the emission or reception of optical signals at the emission end 1312 and the incident end 1321.

The photonic chip module 1 provided in an embodiment includes a photonic chip 100 and a reflective module 200. The photonic chip 100 includes a plurality of transceiving waveguide modules 130, and the transceiving ends of each transceiving waveguide module 130 are arranged at intervals along the second preset direction Y. The first surface 101 of the photonic chip 100 is provided with a plurality of accommodating grooves 103, and the transceiving ends and the accommodating grooves 103 are alternately arranged along the second preset direction Y; each transceiving end corresponds to an accommodating groove 103, and the direction of the detection light emitted by the emitting end points to the corresponding accommodating groove. The reflective module 200 has a plurality of reflective surfaces 221, and the reflective surfaces 221 are arranged at intervals along the second preset direction Y, and there is a one-to-one correspondence between each reflective surface 221, each transceiving waveguide module and each accommodating groove 103. Along the second preset direction Y, one end of the reflecting surface 221 is located in the accommodating groove 103, and the other end exceeds the accommodating groove 103, and the corresponding accommodating groove 103 is away from the side of the corresponding transceiving end. The reflecting surface 221 is configured to reflect the detection light, so that the detection light is emitted in a direction that is not at right angles to the thickness direction, and to reflect the echo light so that the echo light is emitted toward the incident end. In this way, the detection light emitted through each reflecting surface 221 can be staggered in the second preset direction Y, so that a plurality of corresponding sub-detection fields of view can be formed outside the LiDAR, and each sub-detection field of view together constitutes the total detection field of view of the LiDAR. Therefore, the photonic chip module 1 provided in the embodiment is conducive to improving the detection field of view of the LiDAR under the condition of the same resolution, or improving the resolution under the condition of the same total detection field of view.

The above embodiment is described by taking the reflective unit 220 as being inserted into the accommodating groove 103 in an inverted manner relative to the photonic chip 100 as an example, but in other embodiments, the reflective unit 220 can be set in the accommodating groove 103 in a forward manner.

Figure 9:
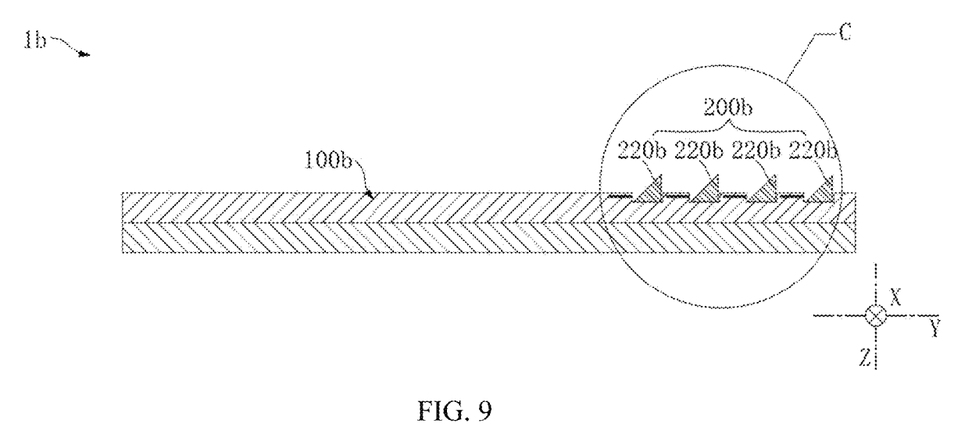
FIG. 9 is a cross-sectional schematic diagram of a photonic chip module provided in some embodiments.
Figure 10:
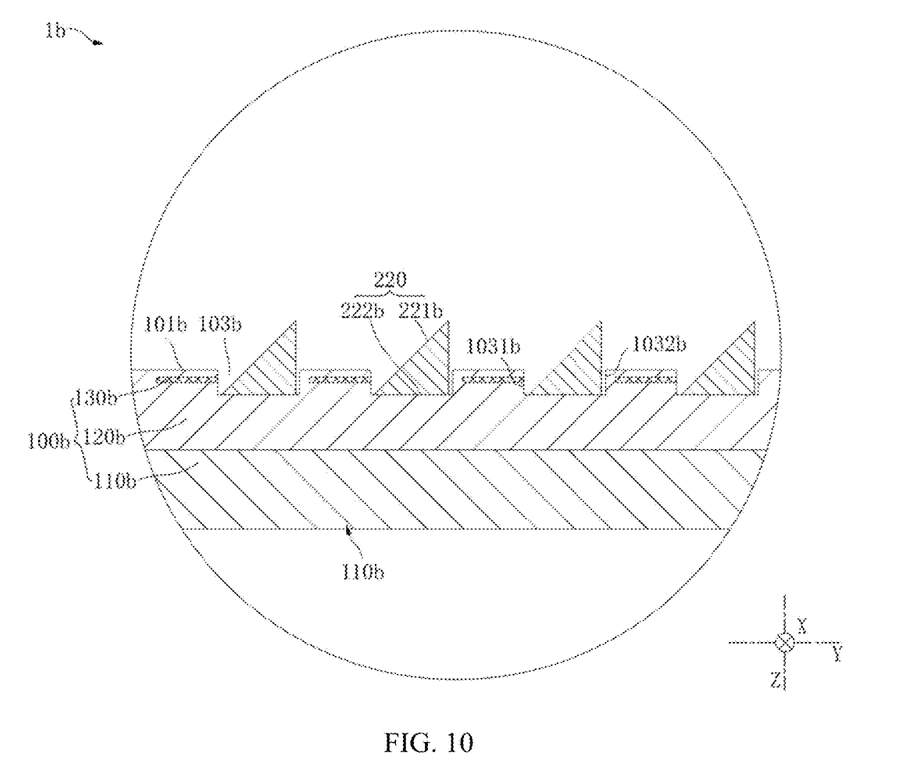
FIG. 10 is a partial enlarged schematic diagram of point C in FIG. 9.

For example, refer to FIG. 9 and FIG. 10, which respectively show a cross-sectional schematic diagram of a photonic chip module 1b in some embodiments (the cross-sectional position can refer to the cross-sectional position of the A-A line in FIG. 1) and a partial enlarged schematic diagram at C. The photonic chip module 1b includes a photonic chip 100b and a reflection module 200b. The photonic chip 100b includes a substrate 110b, a cladding 120b and a plurality of transceiving waveguide modules 130b. The cladding 120b is provided with a plurality of accommodating grooves 103b, and the transceiving ends of the plurality of transceiving waveguide modules 130b and the plurality of accommodating grooves 103b are alternately arranged along the second preset direction Y. The reflection module 200b includes a plurality of reflection units 220b, each reflection unit 220b is installed in an accommodating groove 103b, and the reflection unit 220b includes a reflection surface 221b and a connection surface 222b. The main difference between the photonic chip module 1b and the photonic chip module 1 in the above embodiment is that in the photonic chip module 1b, the reflection unit 220b has no other surface between the reflection surface 221b and the corresponding transceiving end, and the reflection unit 220b directly receives and reflects the detection light and the echo light via the reflection surface 221b.

When observed along the first preset direction X, one end of the reflective surface 221b is located at the bottom of the accommodating groove 103b and is arranged close to the transceiving end; the other end of the reflective surface 221b extends in a direction away from the first side wall 1031 and the bottom of the accommodating groove 103. One end of the connecting surface 222b is connected to one end of the reflective surface 221b close to the corresponding transceiving end, and the other end gradually moves away from the first side wall 1031 along the second preset direction Y; the connecting surface 222b is the surface of the reflective unit 220b facing the bottom of the accommodating groove 103b. Along the second preset direction Y, the reflective unit 220b is located as a whole between the first side wall 1031 and the second side wall 1032 of the corresponding accommodating groove 103, and the reflective surface 221b of the reflective unit 220 is configured to reflect the detection light or the echo light by means of mirror reflection. For example, the reflective surface 221b can be a reflective surface coated with a mirror reflection film layer, or a prism coated with a reflection enhancement film layer.

In an embodiment, detection light and echo light are reflected outside the reflection unit 220b via the reflection surface 221b, unlike the embodiment described in FIGS. 1 to 8, which enters the reflection unit 220 and then reflects via the reflection surface 221. Since the reflection unit 220b in the photonic chip module 1b is the end with a larger cross-sectional profile facing the photonic chip 100b, this will make the size of the accommodating groove 103b along the second preset direction Y larger, and thus make the interval between the detection lights reflected by each reflection unit 220b in the second preset direction Y larger, which will make the interval between each detection light falling on the scanning module and the collimating lens in the LiDAR larger, and this requires LiDAR to be configured with a larger scanning module, such as a galvanometer with a larger diameter or width, and a larger collimating lens. At the same time, the interval of the exit angles of each detection light after collimation by the collimating lens will be further increased, which makes the configuration of the detection field of view corresponding to each detection light more complicated. In comparison, the photonic chip module 1 can ensure that the detection lights reflected by the reflection units 220 have a smaller spacing.

Figure 11:
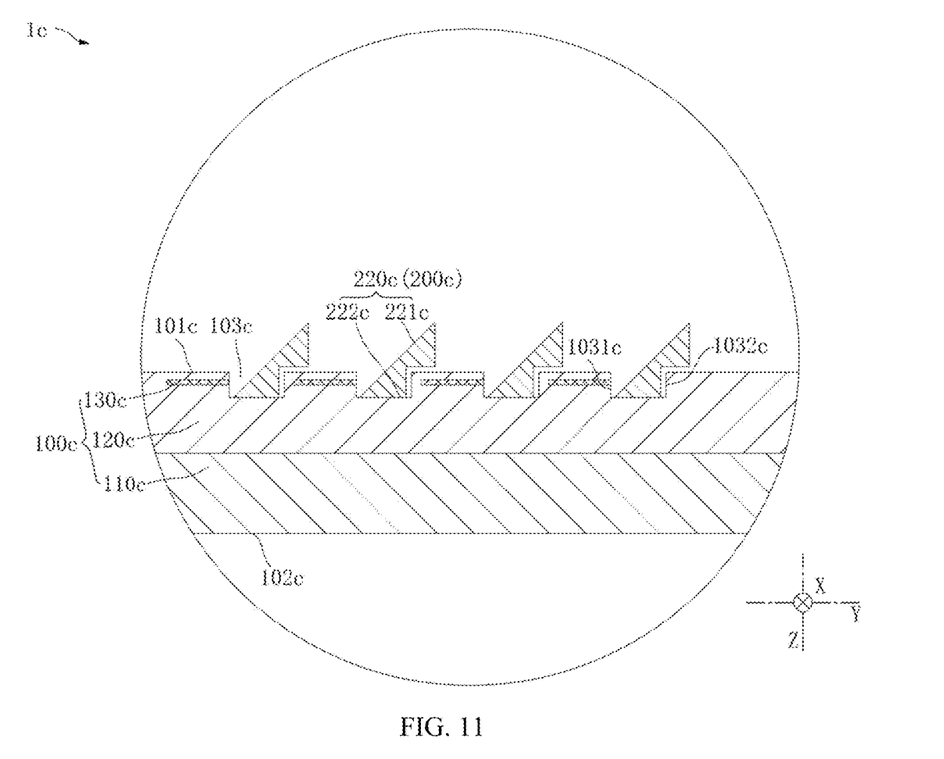
FIG. 11 is a partially enlarged schematic diagram of a photonic chip module provided in some embodiments.

Refer to FIG. 11, which shows a partially enlarged schematic diagram of a photonic chip module 1c provided in some other embodiments (the sectioning position and the enlarged position can be referred to C in FIG. 9), and the photonic chip module 1c includes a photonic chip 100c and a reflection module 200c. The photonic chip 100c includes a substrate 110c, a cladding 120c and a plurality of transceiving waveguide modules 130c. The cladding 120c is provided with a plurality of accommodating grooves 103c, and the transceiving ends of the plurality of transceiving waveguide modules 130c and the plurality of accommodating grooves 103c are alternately arranged along the second preset direction Y. The reflection module 200c includes a plurality of reflection units 220c, each reflection unit 220c is installed in a accommodating groove 103c, and the reflection unit 220c includes a reflection surface 221c and a connection surface 222c. The structure of the photonic chip module 1c is similar to that of the photonic chip module 1b, and the main difference between the photonic chip module 1c and the above-mentioned photonic chip module 1b is that along the second preset direction Y, the reflection unit 220 is not entirely located between the first side wall 1031 and the second side wall 1032 of the corresponding accommodating groove 103c, but is partially located between the first side wall 1031 and the second side wall 1032, and partially located outside the first side wall 1031 and the second side wall 1032.

When observed along the first preset direction X, one end of the reflective surface 221c is located at the bottom of the accommodating groove 103c and is arranged close to the transceiving end; the other end of the reflective surface 221c extends in a direction away from the first side wall 1031 and the bottom of the accommodating groove 103c. Wherein, along the second preset direction Y, the end of the reflective surface 221c away from the corresponding transceiving end is located on the side of the accommodating groove 103 away from the transceiving end. Correspondingly, the end of the reflective unit 220c facing the photonic chip 100c is concave on the side away from the transceiving end to form a second groove, and the second groove is configured to avoid the groove wall on the side of the accommodating groove 103c away from the corresponding transceiving end.

Regarding the installation method of each reflective unit 220c in the reflective module 200c, there are various methods. Each reflective unit 220c can be independently installed in the corresponding accommodation groove 103c, or a base can be set separately, and each reflective unit 220c is set to be fixed to the base. In this way, by adjusting the position of the base, the position of each reflective unit 220c relative to the corresponding transceiving end can be positioned.

1c provided in an embodiment of the present application can also realize a smaller width of the accommodating groove 103c, thereby reducing the interval between the detection lights reflected by each reflection unit 220c.

In some embodiments, taking the photonic chip including a row of accommodating grooves and correspondingly, the reflective module including a row of reflective units as an example. In other embodiments, the photonic chip may include multiple rows of accommodating grooves, and correspondingly, the reflective module may include multiple rows of reflective units. Along the above first preset direction X, each row of accommodating grooves is arranged at intervals, and each row of reflective units is arranged at intervals; when observed along the above first preset direction X, any two reflective surfaces are arranged at intervals along the second preset direction Y, so that the detection light reflected by each reflective surface is staggered in the second preset direction Y.

In an embodiment of setting a row of reflective surfaces, the spacing between two adjacent reflective surfaces along the second preset direction Y is defined as the first spacing, and the spacing between the two reflective surfaces located at the outermost side along the second preset direction Y is defined as the second spacing; in an embodiment of setting multiple rows of accommodating grooves, when observed along the first direction X, the spacing between two adjacent reflective surfaces along the second preset direction Y is defined as the third spacing, and the spacing between the two reflective surfaces located at the outermost side along the second preset direction Y is defined as the fourth spacing. In an embodiment, if the third spacing is set to be the same as the first spacing, the detection field of view of the photonic chip module can be improved; if the fourth spacing is set to be the same as the above-mentioned second spacing, the resolution of the photonic chip module can be improved; if the third spacing is set to be smaller than the first spacing, and the fourth spacing is set to be smaller than the second spacing, the detection field of view and resolution of the photonic chip module can be improved at the same time.

Figure 12:
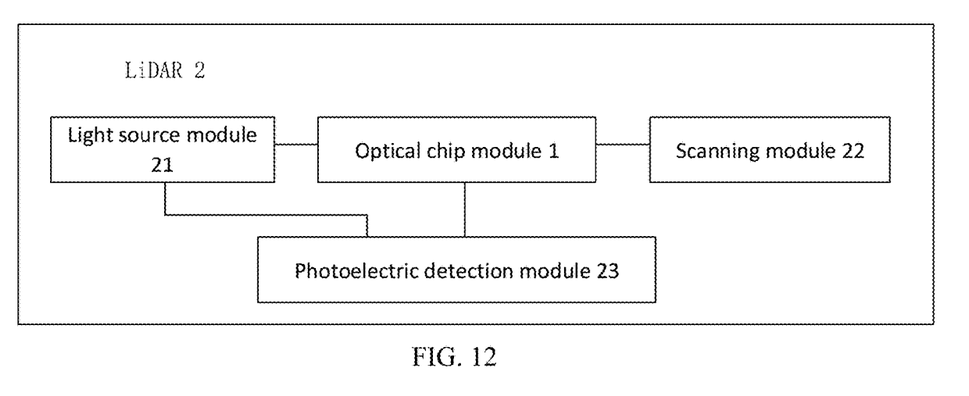
FIG. 12 is a schematic diagram of a LiDAR provided in some embodiments.

Refer to FIG. 12, a LiDAR 2 is provided, which includes photonic chip module 1 (or 1b or 1c). The LiDAR 2 includes a light source module 21, a photonic chip module 1, a scanning module 22 and a photoelectric detection module 23. The light source module 21 is configured to generate a source light signal, which will be subsequently split into a detection light and a local oscillator light. The splitting process can be outside the photonic chip module 1 or on the photonic chip module 1; for example, the light source module 21 includes a laser and a spectrometer, the laser is configured to generate a source light signal, and the spectrometer is configured to receive the above source light signal, and split it to obtain a detection light for detecting a target object, and a local oscillator light for a coherent reference. The photonic chip module 1 is configured to receive the above detection light, transmit and emit, and receive and transmit echo light. The scanning module 22 includes a rotatable element, which is configured to reflect the detection light so that the detection light forms a corresponding detection field of view outside the LiDAR; the scanning module is also configured to reflect the echo light and guide the echo light to the photonic chip module 1. The scanning module 22 may include a multi-faceted rotating mirror and/or a galvanometer. The photoelectric detection module 23 is configured to receive the local oscillation light and the echo light to obtain a beat signal. The photoelectric detection module 23 may include a photodetector, or include an optical mixer and a balanced photodetector. In order to improve the overall integration of the LiDAR, the photoelectric detection module 23 can be integrated into the photonic chip 100. In some embodiments, the photoelectric detection module 23 can be independently set relative to the photonic chip module 1.

The LiDAR 2 provided in an embodiment is conducive to improving the detection field of view of the LiDAR under the condition of the same resolution, or improving the resolution under the condition of the same total detection field of view.

Figure 13:
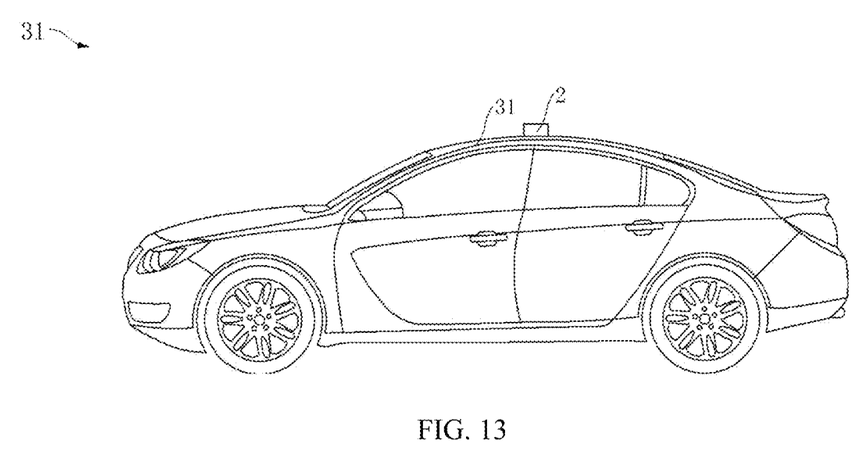
FIG. 13 is a schematic diagram of a removable device provided in some embodiments.

Refer to FIG. 13, a movable device 3 is provided, which includes a movable body 31 and the above-mentioned LiDAR 2, and the LiDAR 2 is mounted on the body 31. In an embodiment, the movable device 3 is a car; wherein the body 31 is the body of the car, and the LiDAR is mounted on the body. In some embodiments, the movable device can be any mobile tool equipped with the above-mentioned LiDAR 2, such as an electric car, a drone, a robot, etc.

Since the LiDAR 2 is included, the movable device 3 is conducive to improving the detection field of view of the LiDAR under the condition of the same resolution, or improving the resolution under the condition of the same total detection field of view.

The terms "first", "second", etc. are used for descriptive purposes only and should not be understood as indicating or implying relative importance. The meanings of the above terms can be understood according to the specific circumstances. Unless otherwise specified, "multiple" refers to two or more. "And/or" describes the association relationship of associated objects, indicating that three relationships may exist. For example, A and/or B can represent: A exists alone, A and B exist at the same time, and B exists alone. The character "/" generally indicates that the objects associated before and after are in an "or" relationship.

What is claimed is:

1. A photonic chip module, comprising:
a photonic chip, comprising a cladding and a plurality of transceiving waveguide modules embedded in the cladding, wherein each transceiving waveguide module comprises an emitting waveguide and a receiving waveguide, the emitting waveguide is configured to transmit detection light, the emitting waveguide has an output end for emitting the detection light, the receiving waveguide is configured to transmit echo light, the receiving waveguide has an incident end for receiving the echo light, the echo light is formed by the detection light reflected by a target object, when observed along a thickness direction of the photonic chip, the output end and the incident end are arranged at intervals along a first preset direction, and together constitute a transceiving end of the transceiving waveguide module, the transceiving ends of the transceiving waveguide modules are arranged at intervals along a second preset direction, the photonic chip has a first surface and a second surface opposite to each other along the thickness direction, the first surface is provided with a plurality of accommodating grooves, the transceiving ends and the accommodating grooves are alternately arranged along the second preset direction, each of the transceiving end corresponds to one of the accommodating grooves, and the detection light emitted by the output end can be injected into corresponding accommodating groove; and a reflection module, comprising a plurality of reflection surfaces, wherein the plurality of reflection surfaces are arranged at intervals along the second preset direction, there is a one-to-one correspondence among each of the reflection surfaces, each of the transceiving waveguide modules and each of the accommodating grooves, each reflection surface and corresponding transceiving end are arranged relative to each other along the second preset direction, the reflection surface is configured to reflect the detection light, so that the detection light is emitted in a direction that is not perpendicular to the thickness direction, and is configured to reflect the echo light, so that the echo light is emitted toward the incident end, each reflection surface is inclined relative to the first surface, and along the second preset direction, each reflection surface has a first end and a second end opposite to each other, the first end is closer to the transceiving end than the second end, the first end is located at the accommodating groove, and the second end is located at a side of the corresponding accommodating groove away from the corresponding transceiving end;

wherein the first preset direction, the second preset direction and the thickness direction are perpendicular to each other.

2. The photonic chip module according to claim 1, wherein the reflection module comprises a plurality of reflection units, and each of the reflection units is arranged in a one-to-one correspondence with each of the accommodating grooves;

wherein the reflection unit has the reflection surface and a connection surface, one end of the connection surface is connected to the first end, and the other end of the connection surface extends away from the second surface; and wherein the connecting surface is configured to allow the detection light to enter the reflection unit, so that the detection light is reflected by the reflection surface, and is configured to allow the echo light reflected from the reflection surface to exit, so that the echo light is emitted toward the incident end.

3. The photonic chip module according to claim 2, wherein the reflection surface is configured to reflect the detection light and the echo light in a total reflection manner.

4. The photonic chip module according to claim 2, wherein the reflection module further comprises a base, and the base is arranged on a side of the photonic chip where the first surface is arranged; and wherein the reflection unit is fixed to the base and is located between the base and the photonic chip.

5. The photonic chip module according to claim 4, wherein the reflection module further comprises a supporting portion; and wherein the supporting portion is fixed to one end of the base facing the photonic chip, and is fixed to the photonic chip.

6. The photonic chip module according to claim 5, wherein the supporting portion comprises a first portion;

wherein the first portion is located at one side of each of the reflection units, and the direction in which the first portion points to each of the reflection units is the same as the direction in which the transceiving end points to corresponding reflection surface; and wherein the first portion is integrally arranged with a reflecting unit close to the first portion.

7. The photonic chip module according to claim 2, wherein a side wall of the accommodating groove comprises a first side wall and a second side wall arranged opposite to each other along the second preset direction, the first side wall is the side wall portion of the accommodating groove close to corresponding transceiving end, and the connecting surface is in contact with the first side wall; and wherein the first side wall is provided with a first groove, and the transceiving end is located at a side of the first groove away from the accommodating groove and is arranged opposite to the first groove.

8. The photonic chip module according to claim 2, wherein the photonic chip is provided with a plurality of rows of accommodating grooves, and along the first preset direction, the plurality of rows of accommodating grooves are arranged at intervals;

the reflection module comprises a plurality of rows of reflection units, and along the first preset direction, the plurality of rows of reflection units are arranged at intervals, and each row of reflection units corresponds to a row of accommodating grooves; and viewed along the first preset direction, any two of the reflective surfaces are spaced apart along the second preset direction Y.

9. The photonic chip module according to claim 2, wherein one end of the accommodation groove along the first preset direction extends to penetrate the photonic chip to form a through opening; and along the first preset direction, one end of the reflection unit is located in the accommodation groove, and the other end extends out of the photonic chip through the through opening.

10. The photonic chip module according to claim 2, wherein the accommodating grooves are located inside the edge contour of the photonic chip when viewed along the thickness direction.

11. The photonic chip module according to claim 2, wherein the reflection module comprises a plurality of reflection units, and each reflection unit is arranged corresponding to one of the accommodating grooves; and wherein the reflecting surface is a surface of the reflecting unit facing the corresponding transceiving end, and the reflecting unit has no other surface between the reflecting surface and corresponding transceiving end; an end of the reflecting unit facing the photonic chip is recessed on the side away from the transceiving end to form a second groove, and the second groove is configured to avoid the groove wall on the side of the accommodating groove away from the corresponding transceiving end.

12. A LIDAR, comprising:
a light source module, used for generating a source light signal;
the photonic chip module according to claim 1, used for transmitting and emitting the detection light, and for receiving and transmitting the echo light, wherein the detection light is part of the source light signal;
a scanning module, used for reflecting the detection light emitted by the photonic chip module, so that the detection light forms a detection field of view outside the LiDAR, and for reflecting the echo light so that the echo light is emitted toward the photonic chip module; and
a photoelectric detection module, used to receive a local oscillation light and an echo light transmitted through the photonic chip module, wherein the local oscillation light is part of the source light signal.

13. A movable device, comprising a movable main body and the LiDAR according to claim 12, wherein the LiDAR is mounted on the main body.

* * * * *